(12) United States Patent
Soderberg et al.

(10) Patent No.: US 7,349,629 B1
(45) Date of Patent: Mar. 25, 2008

(54) METHODS AND SYSTEMS FOR CREATING A DIGITAL INTERCONNECT FABRIC

(75) Inventors: John Jesse Soderberg, Acworth, GA (US); Nelson Corby, Scotia, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 822 days.

(21) Appl. No.: 10/305,214

(22) Filed: Nov. 26, 2002

(51) Int. Cl.
    *H04B 10/20* (2006.01)

(52) U.S. Cl. .................. 398/60; 398/164; 398/115; 398/116; 398/166; 398/165; 398/82; 398/83; 398/79; 398/58; 398/59; 398/69; 398/70; 398/71; 398/72; 398/100; 398/141; 398/135; 398/138; 398/139; 385/24; 385/14; 385/15; 385/31; 385/88; 385/89; 385/92; 385/93

(58) Field of Classification Search .................. 398/29, 398/82, 83, 59, 69, 66, 70, 60, 71, 72, 164, 398/115, 166, 116, 165, 79, 100, 141, 135, 398/138, 139, 58; 385/24, 27, 31, 48, 45, 385/47, 14, 15, 88, 89, 92, 93
See application file for complete search history.

(56) References Cited

U.S. PATENT DOCUMENTS

| | | | |
|---|---|---|---|
| 3,883,217 A | 5/1975 | Love et al. | |
| 3,887,876 A | 6/1975 | Zeidler | |
| 3,936,141 A | 2/1976 | Milton | |
| 3,943,358 A | 3/1976 | Reymond et al. | |
| 4,054,366 A | 10/1977 | Barnoski et al. | |
| 4,166,946 A | 9/1979 | Chown et al. | |
| 4,234,969 A | 11/1980 | Singh | |
| 4,249,266 A | 2/1981 | Nakamori | |
| 4,301,543 A | 11/1981 | Palmer | |
| 4,307,933 A | 12/1981 | Palmer et al. | |
| 4,317,614 A | 3/1982 | Palmer | |
| 4,366,565 A | 12/1982 | Herskowitz | |
| 4,367,460 A | 1/1983 | Hodara | |
| 4,400,054 A | 8/1983 | Biard et al. | |

(Continued)

FOREIGN PATENT DOCUMENTS

DE     3007958 A1     3/1984

(Continued)

OTHER PUBLICATIONS

Stewart D. Personick, *Optical Fiber Transmission Systems*, pp. 1-3 (1981).

(Continued)

*Primary Examiner*—Hanh Phan
(74) *Attorney, Agent, or Firm*—Kilpatrick Stockton LLP

(57) ABSTRACT

An optical network provides a digital interconnect fabric allowing nodes to seamlessly communicate with each other. Each node is connected to a bi-directional optical bus through passive optical interface devices. The optical interface devices route signals from each node onto the bus in both directions and also route signals traveling along the bus in either direction to each node. The optical interface devices and optical bus are passive and do not involve any regeneration of the electrical signals. The nodes are assigned wavelengths of transmission and have tunable receivers for selecting a wavelength of reception. The digital interconnect fabric facilitates Ethernet, Fibre Channel, and other digital communication protocols.

6 Claims, 4 Drawing Sheets

U.S. PATENT DOCUMENTS

| | | |
|---|---|---|
| 4,423,922 A | 1/1984 | Porter |
| 4,435,849 A | 3/1984 | Ilgner et al. |
| 4,446,515 A | 5/1984 | Sauer et al. |
| 4,457,581 A | 7/1984 | Johnson et al. |
| 4,482,980 A | 11/1984 | Korowitz et al. |
| 4,506,153 A | 3/1985 | Ohno |
| 4,543,574 A | 9/1985 | Takagi et al. |
| 4,545,074 A | 10/1985 | Balliet et al. |
| 4,554,511 A | 11/1985 | Braun |
| 4,577,184 A | 3/1986 | Hodara et al. |
| 4,595,839 A | 6/1986 | Braun et al. |
| 4,630,256 A | 12/1986 | Albanese |
| 4,654,890 A | 3/1987 | Hasegawa et al. |
| 4,671,608 A | 6/1987 | Konishi |
| 4,674,830 A | 6/1987 | Shaw et al. |
| 4,705,350 A | 11/1987 | Cheng |
| 4,715,012 A | 12/1987 | Mueller, Jr. |
| 4,717,229 A | 1/1988 | Cutler |
| 4,731,784 A | 3/1988 | Keller et al. |
| 4,739,183 A | 4/1988 | Tokura et al. |
| 4,756,595 A | 7/1988 | Braun et al. |
| 4,759,011 A | 7/1988 | Hicks, Jr. |
| 4,761,833 A | 8/1988 | Epworth |
| 4,786,130 A | 11/1988 | Georgiou et al. |
| 4,810,052 A | 3/1989 | Fling |
| 4,829,593 A | 5/1989 | Hara |
| 4,845,483 A | 7/1989 | Negishi |
| 4,850,047 A | 7/1989 | Iguchi et al. |
| 4,883,335 A | 11/1989 | Alferness et al. |
| 4,885,589 A | 12/1989 | Edward et al. |
| 4,898,565 A | 2/1990 | Braun |
| 4,932,004 A | 6/1990 | Hodara et al. |
| 4,946,244 A | 8/1990 | Schembri |
| 4,947,134 A | 8/1990 | Olsson |
| 4,948,218 A | 8/1990 | Kobayashi et al. |
| 4,958,354 A | 9/1990 | Urakami et al. |
| 4,959,837 A | 9/1990 | Fevrier et al. |
| 5,029,306 A | 7/1991 | Bull et al. |
| 5,046,137 A | 9/1991 | Kurobe et al. |
| 5,055,827 A | 10/1991 | Philipp |
| 5,058,101 A | 10/1991 | Albanese et al. |
| 5,058,974 A | 10/1991 | Mollenauer |
| 5,080,505 A | 1/1992 | Epworth |
| 5,083,874 A | 1/1992 | Aida et al. |
| 5,117,196 A | 5/1992 | Epworth et al. |
| 5,117,303 A | 5/1992 | Desurvire et al. |
| 5,129,019 A | 7/1992 | Robberg et al. |
| 5,133,031 A | 7/1992 | Tanaka et al. |
| 5,179,603 A | 1/1993 | Hall et al. |
| 5,181,134 A | 1/1993 | Fatehi et al. |
| 5,185,735 A | 2/1993 | Ernst |
| 5,187,605 A | 2/1993 | Shikata et al. |
| 5,189,541 A | 2/1993 | Konishi |
| 5,212,577 A | 5/1993 | Nakamura et al. |
| 5,222,166 A | 6/1993 | Weltha |
| 5,267,071 A | 11/1993 | Little et al. |
| 5,283,687 A | 2/1994 | Hsu et al. |
| 5,296,957 A | 3/1994 | Takahashi et al. |
| 5,307,197 A | 4/1994 | Tanabe et al. |
| 5,309,564 A | 5/1994 | Bradley et al. |
| 5,315,424 A | 5/1994 | Boden et al. |
| 5,317,580 A | 5/1994 | Auffret et al. |
| 5,319,642 A | 6/1994 | Ota |
| 5,345,230 A | 9/1994 | Jackson et al. |
| 5,347,384 A | 9/1994 | McReynolds et al. |
| 5,361,262 A | 11/1994 | Cheung |
| 5,363,367 A | 11/1994 | Kobayashi et al. |
| 5,369,516 A | 11/1994 | Uchida |
| 5,392,154 A | 2/1995 | Lin et al. |
| 5,412,746 A | 5/1995 | Rossberg et al. |
| 5,414,416 A | 5/1995 | Yamakita et al. |
| 5,424,864 A | 6/1995 | Emura |
| 5,432,874 A | 7/1995 | Muraguchi |
| 5,434,861 A | 7/1995 | Pritty et al. |
| 5,471,342 A | 11/1995 | Junginger et al. |
| 5,479,082 A | 12/1995 | Calvani et al. |
| 5,481,478 A | 1/1996 | Palmieri et al. |
| 5,483,233 A | 1/1996 | Pettitt et al. |
| 5,500,857 A | 3/1996 | Nakata |
| 5,500,867 A | 3/1996 | Krasulick |
| 5,502,589 A | 3/1996 | Yamamoto et al. |
| 5,506,709 A | 4/1996 | Segal et al. |
| 5,508,689 A | 4/1996 | Rado et al. |
| 5,517,622 A | 5/1996 | Ivanoff et al. |
| 5,528,408 A | 6/1996 | McGinley et al. |
| 5,533,153 A | 7/1996 | Ota |
| 5,539,558 A | 7/1996 | Yonemura et al. |
| 5,541,957 A | 7/1996 | Lau |
| 5,548,431 A | 8/1996 | Shin et al. |
| 5,552,921 A | 9/1996 | Hetzel et al. |
| 5,572,612 A | 11/1996 | Delavaux et al. |
| 5,615,290 A | 3/1997 | Harasawa et al. |
| 5,623,169 A | 4/1997 | Sugimoto et al. |
| 5,664,035 A | 9/1997 | Tsuji et al. |
| 5,684,899 A | 11/1997 | Ota |
| 5,712,932 A | 1/1998 | Alexander et al. |
| 5,712,937 A | 1/1998 | Asawa et al. |
| 5,717,795 A * | 2/1998 | Sharma et al. ............... 385/24 |
| 5,732,086 A | 3/1998 | Liang et al. |
| 5,739,938 A | 4/1998 | Goutzoulis et al. |
| 5,745,479 A | 4/1998 | Burns et al. |
| 5,764,821 A | 6/1998 | Glance |
| 5,777,561 A | 7/1998 | Chieu et al. |
| 5,778,118 A | 7/1998 | Sridhar |
| 5,793,908 A | 8/1998 | Mizuochi et al. |
| 5,796,890 A | 8/1998 | Tsuji et al. |
| 5,801,865 A | 9/1998 | Weis et al. |
| 5,809,187 A | 9/1998 | Peck, Jr. et al. |
| 5,815,294 A | 9/1998 | Ishikawa et al. |
| 5,825,515 A | 10/1998 | Anderson |
| 5,825,949 A | 10/1998 | Choy et al. |
| 5,838,989 A | 11/1998 | Hutchison et al. |
| 5,854,698 A | 12/1998 | Eskildsen et al. |
| 5,866,898 A | 2/1999 | Hodgson et al. |
| 5,880,863 A | 3/1999 | Rideout et al. |
| 5,894,362 A | 4/1999 | Onaka et al. |
| 5,896,417 A | 4/1999 | Lau |
| 5,898,673 A | 4/1999 | Riggan et al. |
| 5,898,801 A | 4/1999 | Braun et al. |
| 5,901,260 A | 5/1999 | Braun et al. |
| 5,910,851 A | 6/1999 | Flaherty |
| 5,937,032 A | 8/1999 | Nummelin et al. |
| 5,943,148 A | 8/1999 | Hamel et al. |
| 5,949,560 A | 9/1999 | Roberts et al. |
| 5,959,412 A | 9/1999 | Ushijlmia |
| 5,995,258 A | 11/1999 | Weber et al. |
| 6,008,915 A | 12/1999 | Zyskind |
| 6,014,481 A | 1/2000 | Kremers |
| 6,075,628 A | 6/2000 | Fisher et al. |
| 6,075,648 A | 6/2000 | Yamamoto et al. |
| 6,084,233 A | 7/2000 | Hodgson et al. |
| 6,111,888 A | 8/2000 | Green et al. |
| 6,122,095 A | 9/2000 | Fatchi |
| 6,128,111 A | 10/2000 | Roberts |
| 6,140,920 A | 10/2000 | Roberts |
| 6,157,725 A | 12/2000 | Becker |
| 6,175,533 B1 | 1/2001 | Lee et al. |
| 6,385,366 B1 | 5/2002 | Lin |
| 6,426,815 B1 * | 7/2002 | Koehler ...................... 398/59 |
| 6,449,072 B1 | 9/2002 | Sian et al. |
| 6,499,027 B1 | 12/2002 | Weinberger |
| 6,502,131 B1 | 12/2002 | Vaid et al. |
| 6,567,197 B1 * | 5/2003 | Glance ...................... 398/82 |
| 6,782,422 B1 | 8/2004 | Bahl et al. |

| | | | |
|---|---|---|---|
| 6,784,837 B2 | 8/2004 | Revankar et al. | |
| 6,830,221 B1 | 12/2004 | Janson et al. | |
| 6,912,339 B2 | 6/2005 | Whittaker | |
| 2002/0018260 A1 | 2/2002 | Kisovec et al. | |
| 2002/0032780 A1 | 3/2002 | Moore, et al. | |
| 2002/0044565 A1 | 4/2002 | Park | |
| 2002/0065962 A1 | 5/2002 | Bakke et al. | |
| 2002/0083169 A1 | 6/2002 | Aki et al. | |
| 2002/0101636 A1* | 8/2002 | Xiao et al. | 359/127 |
| 2002/0101874 A1 | 8/2002 | Whittaker et al. | |
| 2003/0176196 A1 | 9/2003 | Hall et al. | |
| 2003/0204789 A1 | 10/2003 | Peebles et al. | |
| 2003/0206134 A1 | 11/2003 | Lier et al. | |
| 2004/0043795 A1 | 3/2004 | Zancewicz | |
| 2004/0076429 A1 | 4/2004 | Meroth et al. | |
| 2004/0076434 A1 | 4/2004 | Whittaker et al. | |
| 2005/0213973 A1 | 9/2005 | Rohner et al. | |

FOREIGN PATENT DOCUMENTS

| | | |
|---|---|---|
| DE | 3807072 A1 | 8/1988 |
| DE | 3938856 A1 | 11/1989 |
| DE | 4331330 A1 | 9/1993 |
| DE | 4226838 | 2/1994 |
| DE | 4427187 A1 | 2/1996 |
| EP | 0 069 356 A2 | 1/1983 |
| EP | 000103873 A2 | 3/1984 |
| EP | 0 105 753 A2 | 4/1984 |
| EP | 0 164 652 A2 | 12/1985 |
| EP | 0 231 635 A2 | 8/1987 |
| EP | 0 356 090 A2 | 2/1990 |
| EP | 0 380 341 A2 | 8/1990 |
| EP | 0 393 293 | 10/1990 |
| EP | 0 414 333 A2 | 2/1991 |
| EP | 0 414 333 A3 | 2/1991 |
| EP | 0 905 936 A2 | 3/1991 |
| EP | 0 451 426 | 10/1991 |
| EP | 0 503 212 | 9/1992 |
| EP | 0 739 103 A2 | 10/1996 |
| EP | 0 744 797 A1 | 11/1996 |
| EP | 0 899 161 A1 | 3/1999 |
| EP | 0 350 720 A2 | 1/2001 |
| EP | 0 350 720 A3 | 1/2001 |
| EP | 1 246 378 A2 | 10/2002 |
| FR | 2574565 | 6/1986 |
| GB | 2073877 | 10/1981 |
| GB | 2087679 | 5/1982 |
| GB | 2102232 | 1/1983 |
| GB | 2189961 | 11/1987 |
| GB | 2255683 | 11/1992 |
| JP | 11-87823 | 7/1989 |
| JP | 7-202921 | 8/1995 |
| JP | 9/51322 | 2/1997 |
| JP | 9-321739 | 12/1997 |
| JP | 10-107773 | 4/1998 |
| JP | 11-331224 | 3/1999 |
| WO | WO 93/03406 | 2/1993 |
| WO | WO 00/57582 | 9/2000 |

OTHER PUBLICATIONS

H. Hodara, and E. Miles, "High-Speed Local Area Networks", *Fiber and Integrated Optics*; (1992) pp. 253-277.

N.A. Olsson, Lightwave Systems With Optical Amplifiers, *Journal of Lightwave Technology*. pp. 1071-1082 (Jul. 1989).

ITU-T Recommendation G.681, Series G: Transmission Systems and Media, Digital Systems and Networks; Functional characteristics of interoffice and long-haul systems using optical amplifiers, including optical multiplexing (Oct. 1996).

ITU-T Recommendation G.692, Series G: Transmission Systems and Media, Digital Systems and Networks; Optical interfaces for multichannel systems with optical amplifiers (Oct. 1998).

Chart and figures for optical fiber cable and baseband transmission, *available at* http://www.microsoft.com/technet/WFW/wfw31/1_ch1.asp, 1998.

HDR 7.0 2 73; 7.0 Fiber Optic Ethernet—Types FOIRL and 10 BASE-F *available at* http://www.uni-trier.de/infos/ether/ethernet-guide/ethernet-guide.html, 1994.

3.0 IEEE Acronyms, *available at* http://spacey.net/ldavis/Design_Ethernet_Note.html, 1994.

Fibre Channel—Overview of the Technology, Sep. 9, 2000, pp. 1-9 *available at* http://fibrechannel.org/technology.

Bi-Directional Optical Backplane Bus for Board to Board Optoelectronic Interconnects, Gicheri Kim, Jinghuai Fa and Ray T. Chen, 1-4 (Sep. 9, 2000) *available at* http://ece.utexas.edu/projects/ece/mrc/profs/chen_projects/optbus/optbus.html.

SOME Bus (Simultaneous Optical Multiprocessor Exchange Bus)(Sep. 9, 2000) *available at* http://eb.uah.edu/~cohen/some_bus/some_bus.html.

Integrated Explorations of the Spectral, Temporal and Spatial Degrees of Freedom 1 (Sep. 9, 2000) *available at* http://thebusinessedge.com/reruns/cito/sargent/sld001.htm.

Challenges in IP LANs on Higher-Dimensional Encoding (slide 4) (Sep. 9, 2000) *available at* http://thebusinessedge.com/reruns/cito/sargent/sld004.htm.

0034-P PCI 1-Gig Fibre Channel Optical Host Bus Adapter 1-4 *available at* http://solutions.sun.com/dbsearch/index.cgi?STATE=product&CMD=show&p_id=58181 (Sep. 9, 2000).

Architectural and Engineering Issues for Building an Optical Internet 1—55 (Sep. 9, 2000) *available at* http://www.canet3.net/papers/ArchandEngIssues.html.

Baker, *Monomode Fiber-Optic Design with Local- Area and Long-Haul Network Applications*, pp. 370-371, 1987.

Karim, *Chapter 9: Electro-Optical Devices and Systems*, Fiber-Optics-Based Devices and Systems, pp. 434-435, 1989.

Chinlon Lin, *Systems Applications of WDM Technologies in Optical Communications*, SPIE-International Society for Optical Engineering (Aug. 15-18, 1994).

Manuel Lopez-Amo, Loudon T Blair & Paul Urquhart, *Wavelength-Division-Multiplexed distributed optical fiber amplifier bus network for data and sensors*, Optics Letter 1159-61 (Jul. 15, 1993).

Francesco Matera & Marina Settembre, *Performance Evaluation of Optically Amplified Systems Operating in Optical Networks*, Microwave & Optical Technology Letters (Nov. 1996).

Spirit et al., *140-km 20-Gbit/s repeaterless transmission employing distributed erbium amplification*, Optical Fiber Communication Conference (1992).

Philip J. Koopman, Jr., and Bhargav P. Upender., "Time Division Multiple Access Without a Bus Master," United Technologies Research Center, UTRC Technical Report RR-9500470 (Jun. 1995).

Technical Report CSRI-298 entitled "A New Binary Logarithmic Arbitration Method for Ethernet," by Mart L. Molle of Computer Systems Research Institute, pp. 1-57 (Apr. 1994).

WRL Research Report 88/4 entitled "Measured Capacity of an Ethernet: Myths and Reality" by David R. Boggs, et al., printed by Digital Western Research Laboratory, Palo Alto, California (Sep. 1998) (pp. 1-31), originally published in *Proceedings of the SIGCOMM '88 Symposium on Communications Architectures and Protocols*, ACM SIGCOMM, Stanford, California, Aug. 1988.

Yamashita, et al., "Studies of a system gathering multi-channel visual signals using a single optical fiber and a bi-directional optical amplifier," *T. IEE Japan*, 119-C(12):1528-1534 (1999).

Kempainen, "Optical Networking lightens carrier-backbone burden," *EDN*, pp. 63, 64, 65, 66, 68, 70, 72 (Oct. 8, 1998).

Thomas, et al., "Physics in the Whirlwind of Optical Communications," *Physics Today*, pp. 30-36 (Sep. 2000).

Press Release entitled "Lucent Technologies announces record-breaking 320-channel optical networking system," (pp. 1-2) (Apr. 17, 2000).

Iannone, et al., "A 160-km transparent metro WDM ring network featuring cascaded erbium-doped waveguide amplifiers," published by Optical Society of America (2000).

"Performance Management—Management of SONET Networks—White Paper," Clear Communications, *Sonet and Performance Management*, Issue 1, Apr. 1996 (pp. 1-21).

Cisco Wavelength Router Manager—Data Sheet, www.cisco.com/warp/public/cc/so/neso/olso/cwrm_ds.htm (Apr. 25, 2001).

Keyserling, A. and R.C.L., "Chapter 2: Number, Dimensions, Manderlbrot, Chaos, 4 Attractors, Music and Color," www.chanceandchoice.com/ChanceandChoice/chapter2.html, 1994.

Gallardo, et al., "Fast Simulation of Broadband Telecommunications Networks Carrying Long-Range Dependent Bursty Traffic," Preceedings of the 1999 Winter Simulation Conference, pp. 374-381 (Winter 1999).

Willinger, et al., "Self-Similarity Through High-Variability: Statistical Analysis of Ethernet LAN Traffic at the Source Level," pp. 1-31 (Apr. 15, 1997).

DeCotignie, J.D., et al., "Producer-Distributor-Consumer Model on Controller Area Network," Proceedings of the IFAC/IFIC Workshop, Real Time Programming, 1995, pp. 35-42, XP002074139, Oxford, Great Britain.

Liew, "A Broad-Band Optical Network Based on Hierarchical Multiplexing of Wavelengths and RF Subcarariers," *Journal of Lightwave Technology*, 7(11):1825-1838 (1989).

Al-Raweshidy and Komaki (Editors), "Basic Microwave Properties of Optical Links," *Radio Over Fiber Technologies for Mobile Communication Networks*, pp. 7-16 (Published by Artech House, Norwood, Massachusetts) (2002).

Fibre Channel Overview http://his.web.cern.ch/HIS/fcs/spec/overview.htm, pp. 1-10 (Nov. 5, 2002).

Ethernet FAST Ethernet Fiber Optic Media Converters, http://www.versitron.com/Ethernet.html, 2 pages (Nov. 5, 2002).

HomeNetHelp.com, http://www.homenethelp.com/web/explain.about-hubs-and-switches.asp, 5 pages (Nov. 5, 2002).

Fibre Channel, http://www.iol.unh.edu/training/fc/fc_tutorial.html, 22 pages (Nov. 5, 2002).

International Search Report in related Application No. PCT/US03/03310.

International Search Report in related Application No. PCT/US03/03329.

International Search Report in related Application No. PCT/US03/10053.

International Search Report in related Application No. PCT/US03/30326.

International Search Report in related Application No. PCT/US03/29970.

* cited by examiner

METHODS AND SYSTEMS FOR CREATING A DIGITAL INTERCONNECT FABRIC

FIELD OF THE INVENTION

The invention relates generally to systems and methods for providing optical communication networks and, more specifically, to systems and methods for providing a digital interconnect fabric for optical communication networks.

BACKGROUND

Various network topologies exist for enabling terminal equipment at one node to communicate with terminal equipment at another node within the network. FIG. 1(A) illustrates a simple network comprised of a point-to-point connection between two pieces of terminal equipment T1 and T2. In this network, terminal T1 is able to send signals to T2 and can receive signals from T2. Similarly, terminal T2 can both transmit and receive signals from terminal T1. The link between terminals T1 and T2 may comprise a half duplex or full duplex line.

FIG. 1(B) is an example of an arbitrated loop connecting three or more terminals together in a network. In the arbitrated loop, terminal T1 sends signals to terminal T2, terminal T2 sends signals to terminal T3, terminal T3 sends signals to terminal T4, and terminal T4 sends signals to terminal T1. Thus, as shown in the diagram, terminal T1 receives signals from terminal T4, terminal T2 receives signals from terminal T1, terminal T3 receives signals from terminal T2, and terminal T4 receives signals from terminal T3. In essence, communication signals travel in one direction along the loop from a transmitting terminal T until it reaches a receiving terminal T. The terminals T in between do not process the signals but instead act as repeaters within the network. The arbitrated loop is an example of a ring network in which signals are passed from terminal to terminal until they reach the intended recipient or recipients.

FIG. 1(C) is an example of a network having a switch 10. According to this type of network, the switch 10 enables connectivity between a set of M terminals and a set of N terminals. Each of the terminals T1 to TM and T1 to TN may transmit, receive, or both transmit and receive signals. The switch 10 is typically a cross-over switch for making the necessary connections between any one of the terminals T1 to TM to any of the other terminals T1 to TN.

FIG. 1(D) is an illustration of a typical hub network, such as one for Ethernet. With this type of network, a number of terminals are connected to each hub 12. For instance, in this figure, terminal T(1)(1) to terminal T(1)(M) are connected to a common hub 12(1). Each of the terminals T(1)(1) to terminal T(1)(M) communicate with each other through the hub 12(1), which enables half duplex communication between the terminals. The hubs 12 may allow full duplex communication, in which case the hubs 12 may be considered switches. In either event, groups of terminals T communicate with each other through the hubs 12. The hubs 12 are interconnected to each other through a backbone 14 to enable terminals T associated with one hub to communicate with terminals T at another hub.

All of the networks can be considered to have an interconnect fabric. The interconnect fabric generally refers to the ability of a network to direct communication signals from a terminal T at one node to a terminal T at another node within the network. For the network shown in FIG. 1(A), the interconnect fabric may enable one of the terminals T to gain control of a common line which carries signals from either piece of terminal T to the other terminal T. For the network shown in FIG. 1(B), the interconnect fabric may involve some type of token sharing whereby one of the terminals T is able to transmit signals along the loop or ring. For the network shown in FIG. 1(C), the interconnect fabric refers to the switching of signals from one terminal T to another terminal T. For the network shown in FIG. 1(D), the interconnect fabric refers not only to the interconnection between terminals T at one hub 12 but also the interconnection between terminals T at different hubs 12.

Regardless of the network topology, the interconnect fabric also depends upon the communication protocol. One of the most common network protocols is the Ethernet, which is defined by IEEE Standard 802.3, which is incorporated herein by reference. Ethernet has evolved over the years and can be placed on different media. For example, thickwire can be used with 10Base5 networks, thin coax for 10Base2 networks, unshielded twisted pair for 10Base-T networks, and fibre optic for 10Base-FL, 100Base-FL, 1,000Base-FL, and 10,000Base-FL networks. The medium in part determines the maximum speed of the network, with a level 5 unshielded twisted pair supporting rates of up to 100 Mbps. Ethernet also supports different network topologies, including bus, star, point-to-point, and switched point-to-point configurations. The bus topology consists of nodes connected in series along a bus and can support 10Base5 or 10Base2 while a star or mixed star/bus topology can support 10Base-T, 10Base-FL, 100Base-FL, 1,000Base-FL, and Fast Ethernet.

Ethernet, as well as many other types of networks, is a shared medium and has rules for defining when nodes can send messages. With Ethernet, a node listens on the bus and, if it does not detect any message for a period of time, assumes that the bus is free and transmits its message. A major concern with Ethernet is ensuring that the message sent from any node is successfully received by the other nodes and does not collide with a message sent from another node. Each node must therefore listen on the bus for a collision between the message it sent and a message sent from another node and must be able to detect and recover from any such collision. A collision between message occurs rather frequently since two or more nodes may believe that the bus is free and begin transmitting. Collisions become more prevalent when the network has too many nodes contending for the bus and can dramatically slow the performance of the network.

Fibre Channel is another communications protocol that was designed to meet the ever increasing demand for high performance information transfer. As with Ethernet, Fibre Channel is able to run over various network topologies and can also be implemented on different media. For instance, Fibre Channel can work in a point-to-point network such as the one shown in FIG. 1(A), in an arbitrated loop such as the one shown in FIG. 1(B), and can also work in a cross-point switch configuration or hub network, such as those shown in FIGS. 1(C) and 1(D). Fibre Channel is essentially a combination of data communication through a channel and data communication through a network. A channel provides a direct or switched point-to-point connection whereas a network supports interaction among an aggregation of distributed nodes and typically has a high overhead. Fibre Channel allows for an active intelligent interconnection scheme, called a Fabric, to connect devices. A Fibre Channel port provides a simple point-to-point connection between itself and the Fabric.

For most networks, including those that operate under Ethernet and Fibre Channel, the digital interconnect fabric requires some examination of the signals in order to provide the desired interconnection. For instance, in sending signals from one terminal to another, the arbitrated loop, switch, or hub must examine the address in order to ensure that the signal is delivered to the desired terminal. This overhead associated with the digital interconnect fabric is a burden on the network and generally decreases efficiency, speed, and overall performance of the network.

Some attempts have been made to improve performance by using optical communication. By using optical signals and fibers, electromagnetic interference (EMI), noise, and cross-talk can be substantially eliminated and transmission speeds can be increased. Even with optical communication, however, the digital interconnect fabric typically involves converting these optical signals into electrical signals. For instance, with the arbitrated loop, each terminal T receives optical signals, converts them into electrical signals, reviews the addressing information within the electrical signals, and either processes those signals if that terminal T is the intended recipient or regenerates optical signals and forwards them to the next terminal T in the loop. For the network shown in FIG. 1(C), the switch 10 typically converts the optical signals into electrical signals in order to provide the desired interconnection between the terminals T. For the same reason, the hubs 12 also convert the optical signals from the terminals T into electrical signals in order to provide the proper routing to the desired destination terminal T. While the optical lines shield the signals from noise, cross-talk, and EMI, the need to convert the optical signals into electrical signals and then once again generate optical signals reduces signal quality, adds a layer of complexity and cost, and degrades the overall potential performance of the networks.

SUMMARY

The invention addresses the problems above by providing systems and methods for providing a digital interconnect fabric between a plurality of nodes within a network. The network includes a bi-directional optical bus for routing digital optical signals between a plurality of nodes. Each node is connected to the bi-directional optical bus through a passive optical interface device. The passive optical interface device receives signals from the nodes and routes the signals in both directions along the bi-directional optical bus. The passive optical interface devices also take signals traveling along the bi-directional optical bus and route them to each node. Each of the nodes that transmits optical signals is assigned a unique wavelength of transmission. Because the network distributes optical signals from each node to every other node within the network, any node seeking to receive signals from another node can simply receive the signals at the wavelength corresponding to that node's transmission wavelength. The nodes that receive signals may detect signals from all wavelengths of transmission or may have a tunable receiver for selecting only a desired wavelength of transmission.

According to another aspect, in addition to having a wavelength of transmission for the optical signals, each transmitting node may also have the capability of transmitting control optical signals over a control wavelength. This control wavelength provides a control channel for establishing connections between any two nodes. The receiving nodes are able to detect the control signals at the control wavelength as well as optical signals at least one wavelength of transmission. The networks according to the invention do not require any hub or switch for converting optical signals into electrical signals in order to route the signals to the appropriate receiving node. Instead, the optical networks maintain the optical signals in the optical domain which results in improved signal quality, network efficiency, and faster transmission speeds.

Other advantages and features of the invention will be apparent from the description below, and from the accompanying papers forming this application.

BRIEF DESCRIPTION OF DRAWINGS

The accompanying drawings, which are incorporated in and form a part of the specification, illustrate preferred embodiments of the present invention and, together with the description, disclose the principles of the invention. In the drawings.

DETAILED DESCRIPTION

Figure 2:
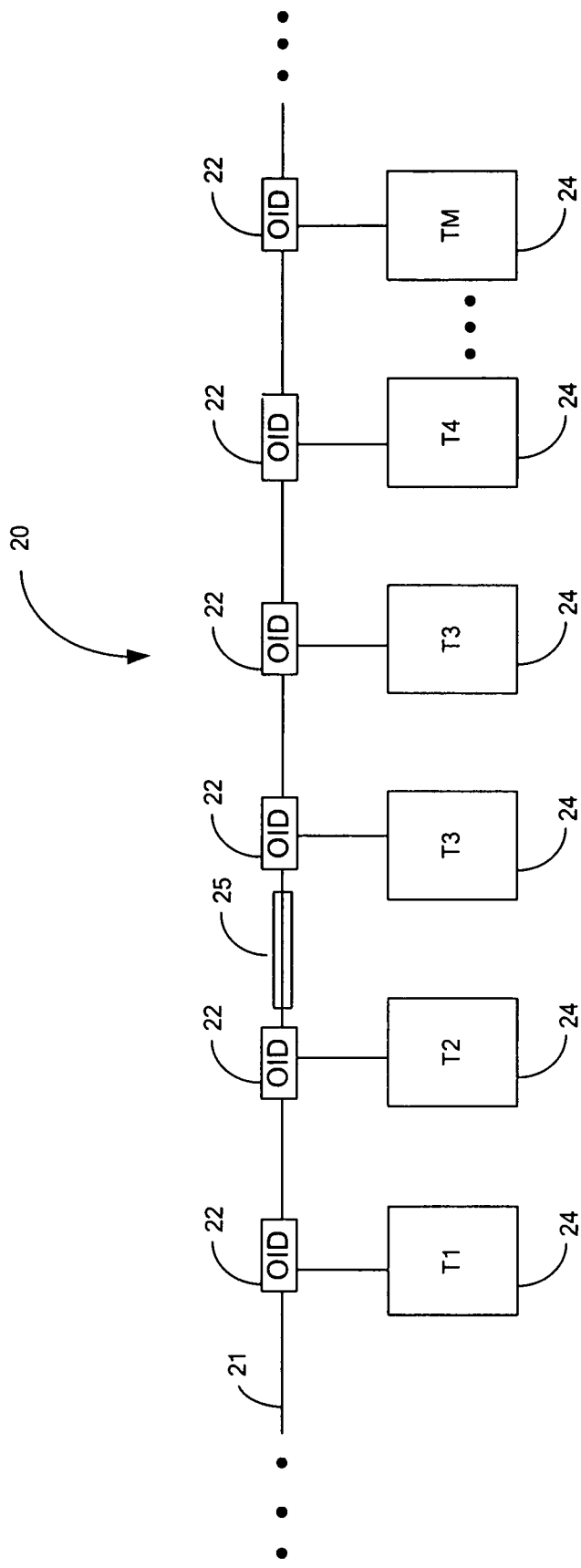
FIG. 2 is a diagram of an optical network according to a preferred embodiment of the invention.

Reference will now be made in detail to preferred embodiments of the invention, non-limiting examples of which are illustrated in the accompanying drawings. With reference to FIG. 2, a network 20 includes a number of nodes 24 each having terminal equipment T. The nodes 24 are coupled to a bi-directional optical bus 21 through Optical Interface Devices (OIDs) 22. The optical network 20, as will be described in more detail below, provides a digital interconnect fabric that addresses many of the problems associated with conventional networks.

The OIDs 16 may comprise any suitable structure for directing optical signals from each node 24 onto the optical bus 21 in both directions and for directing optical signals traveling along the optical bus 21 in both directions toward each node 24. Suitable OIDs are described in U.S. Pat. Nos. 5,898,801 and 5,901,260 and in co-pending patent application Ser. No. 10/280,967, entitled "Optical Interface Devices Having Balanced Amplification," filed on Oct. 25, 2002, all of which are incorporated herein by reference.

The networks 20 according to the invention carry digital signals including, but not limited to, the Ethernet standard, as specified by International Standards Organization (ISO) 802.3, Mil-Std 1553, ARINC-429, RS-232, NTSC, RS-170, RS-422, NTSC, PAL, SECAM, AMPS, PCS, TCP/IP, frame relay, ATM, Fibre Channel, SONET, WAP, VME, PCI, and InfiniBand.

Each node 24 has terminal equipment T that includes at least one of an optical-to-electrical converter and an electrical-to-optical converter. The electrical-to-optical and optical-to-electrical converters may be provided as part of an electro-optical interface circuit (EOIC) as described in U.S. Pat. Nos. 5,898,801 and 5,901,260. The invention is not limited to the type of optical transmitter but includes LEDs and lasers, both externally and directly modulated. As will be appreciated by those skilled in the art, each node 24 may also include translation logic devices and other devices used in the processing or routing of the signals as part of the terminal equipment T. A preferred network is described in U.S. Pat. No. 5,898,801 entitled "Optical Transport System," which is incorporated herein by reference.

The optical bus 21 is preferably a single-mode fibre that carries optical signals in both directions simultaneously to all nodes 24 connected to the bus 21. The optical bus 21 also preferably provides bi-directional optical amplification of the signals traveling along the bus, such as described in U.S. Pat. Nos. 5,898,801 and 5,901,260. Thus, the amplification of the optical signals may occur along a section 25 of the bus 21 interconnecting two of the nodes 24. The optical amplification need not occur along these interconnection sections but alternatively may be provided along paths which interconnect the nodes 24 to the OIDs 22. Furthermore, the optical amplification may occur within the nodes 24 or within the OIDs 22. The optical amplification may be performed through fibre amplifiers, such as erbium-doped fibres or other rare-earth doped fibres, as described in U.S. Pat. Nos. 5,898,801 and 5,901,260. The amplification may also be performed by devices separate from the fibre, such as any of the various discrete laser amplifiers.

Significantly, the amplification that occurs within the network 20 associated with each node 24 compensates for splitting losses to and from that node 24. In other words as optical signals travel down the bi-directional optical bus 21 and encounter an OID 22, a fraction of the optical signals is diverted to the node 24. To compensate for this loss in signal strength, the optical signals are amplified, such as up to their original level, to maintain signal quality and strength. Thus, when the signals arrive at the next downstream node 24, the optical signals are at a level which can be received and processed by the node 24. This process of diverting signals to each node 24 and amplifying the signals preferably continues at each node 24. While each node 24 preferably has an associated amplifier, it should be understood that the amplifiers may not be associated with every node 24 but should be dispersed throughout the network so as to ensure sufficient signal strength for each node 24. While optical amplifiers are preferably included within the network 20 to compensate for losses and to interconnect a greater number of nodes 24, the networks according to the invention may employ no amplifiers or a fewer number of such amplifiers.

The nodes 24 can provide varying levels of communication functionality through their terminal equipment T. The nodes 24 may include only a receiver for detecting communications from the other nodes 24 and/or may have a transmitter for sending communications to the other nodes 24. The nodes 24 may also include additional functionality, such as a display interface. Networks 20 according to the invention may include other numbers of nodes, may include additional or fewer types of nodes, and may include only one type of node. Additional details of the nodes 24 will become apparent from the description below.

The optical network 20 provides a number of advantages over existing systems that are installed in structures. For one, the nodes 24 communicate with each other through optical signals. Consequently, the network 20 enjoys immunity from electromagnetic noise whereby electrical systems within the terminal equipment T do not cause interference with normal operation of any one of the nodes 24. Furthermore, the optical network 20 includes a single bi-directional bus 21 which can be used to interconnect a large number of nodes 24. For example, the network 20 can accommodate in the range of 256 nodes 24 on the single fiber 21. The network 20 therefore presents a viable solution for systems having more than eight to 10 components and, moreover, presents a single solution that can integrate multiple systems. Another advantage of the network 20 is that it greatly simplifies the amount of cabling associated with interconnecting nodes 24. As mentioned above, the network 20 employs a single bi-directional bus 21 with every node 24 being connected to this one bus 21 through an OID 22. This single bi-directional bus 21 greatly simplifies not only the installation of the network 20 but also the maintenance and repair of the network 20.

Figure 1A:
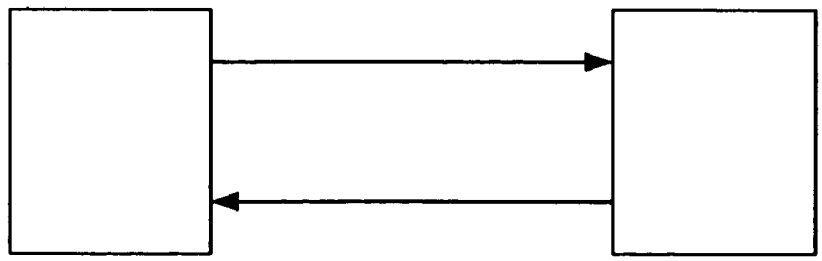
FIGS. 1(A) to 1(D) are diagrams of different network topologies.
Figure 1B:
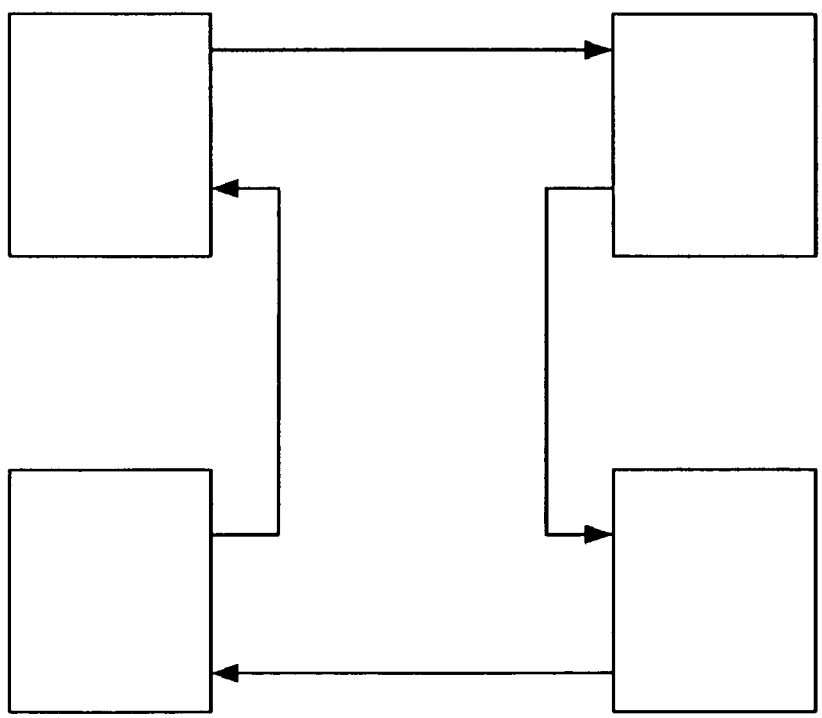
Figure 1C:
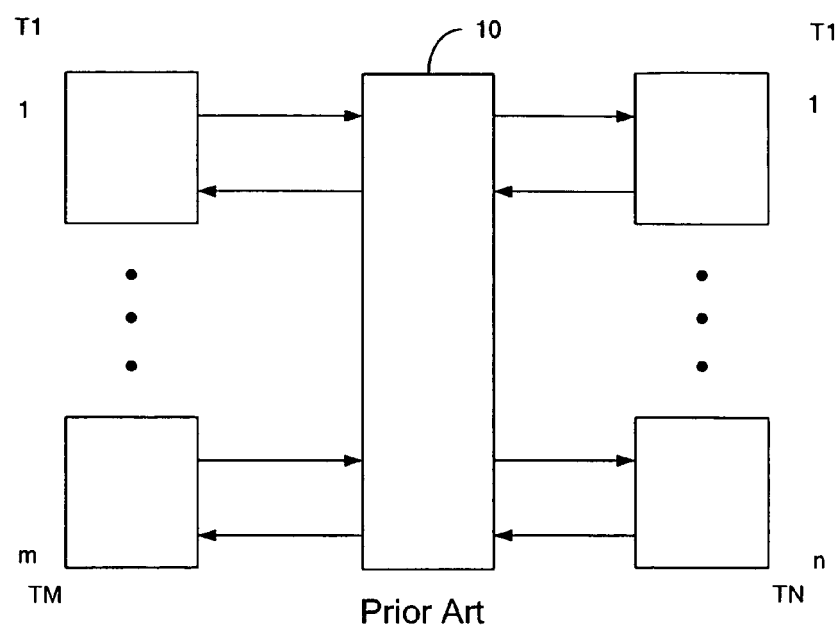
Figure 1D:
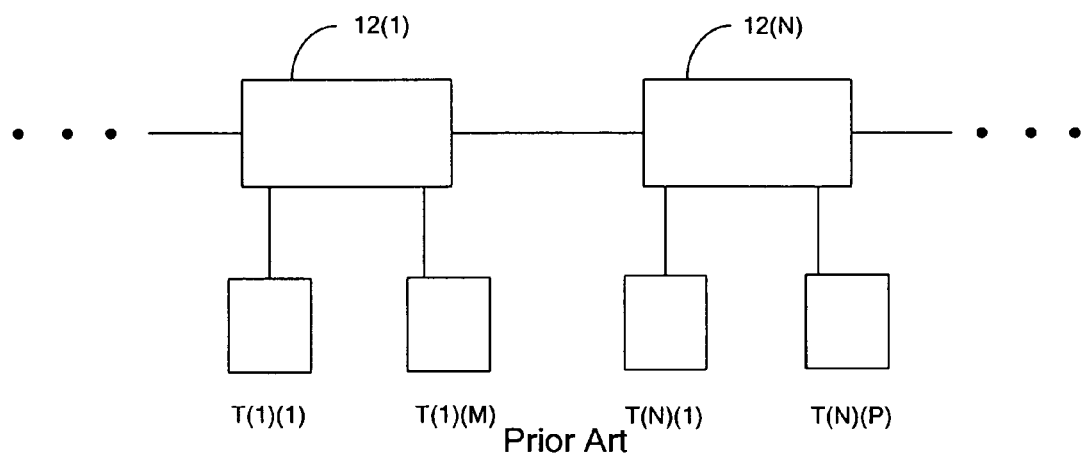
Figure 3:
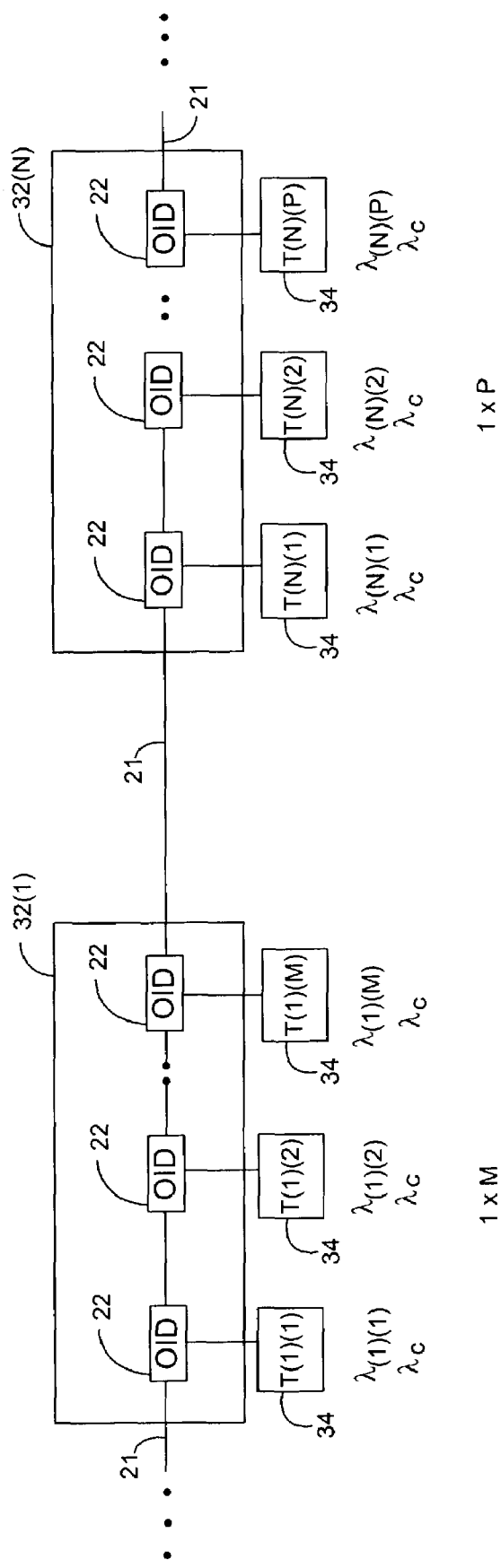
FIG. 3 is a more detailed diagram of the optical network illustrating assignment of wavelengths to nodes.

A more detailed diagram of a network 30 according to the preferred embodiment of the invention will now be described with reference to FIG. 3. The optical network 20, as well as the network 30, includes a digital interconnect fabric. With reference to FIG. 3, the network 30 includes the bi-directional bus 21, the OIDs 22, and terminal equipment T. To highlight the advantages of the invention, FIG. 3 also illustrates groupings 32 of the terminal equipment and OIDs 22 which replace the conventional hub 12 shown in FIG. 1(D). For instance, grouping 32(1) is associated with terminal equipment T(1)(1) to terminal T(1)(M) and the network 30 may include N number of additional groupings 32. Thus, a grouping 32(N) has terminal equipment T(N)(1) to terminal T(N)(P). In general, the network 30 may include N number of groupings 32 with each grouping having one or more terminals T. In this example, grouping 32(1) has M terminals while grouping 32(N) has P terminals.

The digital interconnect fabric according to the preferred embodiment of the invention involves assigning each terminal T a unique wavelength for transmission. In the example shown in FIG. 3, each terminal T has a different wavelength of transmission λ As mentioned above, some terminals T may be receive only in which case no wavelength of transmission needs to be assigned to that terminal T. Thus with reference to FIG. 3, terminals T(1)(1) to terminal T(1)(M) are assigned wavelengths $\lambda_{(1)(1)}$ to $\lambda_{(1)(M)}$. Similarly, terminals T(N)(1) to T(N)(P) are assigned wavelengths $\lambda_{(N)(1)}$ to $\lambda_{(N)(P)}$. Each terminal T transmits at a unique wavelength and these signals are sent to the OID 22 and directed onto the bi-directional optical bus 21 in both directions. The signals from each terminal T thus travel along the bi-directional bus 21 and are routed to every other terminal T through the OIDs 22. Thus, optical signals originating at any of the terminals T are routed to every other terminal T.

To receive signals from another terminal T, a receiving terminal T detects the optical signals at the wavelength corresponding to the transmitting nodes wavelength. According to one aspect, every receiving terminal T receives optical signals from all terminals T and converts all signals into electrical signals. According to this aspect, the receiving terminals T detect the signals from all transmitting terminals T. According to another aspect, the receiving terminals T have a tuneable receiver for selecting a desired wavelength of transmission so that the receiving terminal T can detect the signals from just one transmitting terminal T. Numerous ways exist for having a receiving terminal T tune into the wavelength of a desired transmitting terminal T. For example, each transmitting terminal T may also transmit control signals over a control wavelength $\lambda_C$. Each receiving node detects any control signals at wavelength $\lambda_C$ with these control signals $\lambda_C$ coordinating the tuning of the receiving terminals wavelength to the wavelength of a desired transmitting terminal T. The receiving terminals T may also have the capability of transmitting at the control wavelength $\lambda_C$ for establishing channels between a transmitting terminal T and a receiving terminal T.

As should be apparent from the above description, the network 30 provides a digital interconnect fabric which, in essence, provides point-to-point connections between any two nodes 24 or terminals T within the network 30. This digital interconnect fabric does not require any hubs or switches that convert optical signals into electrical signals for the purpose of routing the signals to the appropriate node. Instead, signals from all nodes 24 are available at every other node. By maintaining the signals in the optical domain, the networks according to the invention provide improved performance and improved signal quality.

The foregoing description of the preferred embodiments of the invention has been presented only for the purpose of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated.

We claim:

1. An optical communication network, comprising:
    a bi-directional optical bus for routing optical digital signals at a plurality of different wavelengths;
    a plurality of nodes having terminal equipment for performing at least one of transmitting digital optical signals onto the bi-directional optical bus and receiving optical digital signals from the bi-directional optical bus;
    a plurality of passive optical interface devices connected to the bi-directional optical bus;
    each node connected to the bi-directional optical bus through no more than one passive optical interface device;
    the passive optical interface devices routing optical digital signals from the terminal equipment at the nodes onto the bi-directional optical bus in both directions;
    the passive optical interface devices routing optical digital signals traveling along the bi-directional optical bus in either direction toward the nodes;
    each node being assigned a unique wavelength of transmission for transmitting optical digital signals;
    each node receiving optical digital signals at least at one wavelength of reception, the wavelength of reception for a node being different than the wavelength of transmission for that node;
    the bi-directional optical bus and the passive optical interface devices serving as a digital interconnect fabric for the plurality of nodes,
    wherein each of the nodes receives optical control signals at a first wavelength and each node has a tunable receiver for selecting a second wavelength for receiving optical digital signals at the wavelength of reception.

2. An optical communication network, comprising:
    a bi-directional optical bus for routing optical digital signals at a plurality of different wavelengths;
    a plurality of nodes having terminal equipment for performing at least one of transmitting digital optical signals onto the bi-directional optical bus and receiving optical digital signals from the bi-directional optical bus;
    a plurality of passive optical interface devices connected to the bi-directional optical bus;
    each node connected to the bi-directional optical bus through no more than one passive optical interface device;
    the passive optical interface devices routing optical digital signals from the terminal equipment at the nodes onto the bi-directional optical bus in both directions;
    the passive optical interface devices routing optical digital signals traveling along the bi-directional optical bus in either direction toward the nodes;
    each node being assigned a unique wavelength of transmission for transmitting optical digital signals;
    each node receiving optical digital signals at least at one wavelength of reception, the wavelength of reception for a node being different than the wavelength of transmission for that node;
    the bi-directional optical bus and the passive optical interface devices serving as a digital interconnect fabric for the plurality of nodes,
    wherein a transmitting node transmitting optical digital signals to a desired node provides optical control signals to the desired node informing the desired node of the wavelength of transmission for the transmitting node.

3. A method of exchanging digital signals between a plurality of nodes within a network, comprising:
    generating electrical digital signals at each node transmitting digital signals;
    assigning to each node transmitting digital signals a wavelength of transmission for its digital signals;
    converting the digital signals into optical digital signals at the wavelength of transmission assigned to each transmitting node;
    passively routing the optical digital signals onto a bi-directional optical bus through no more than one passive optical interface device at each node;
    routing the optical digital signals from each transmitting node in both directions along the bi-directional optical bus;
    passively routing the optical digital signals to each node receiving optical digital signals through no more than one passive optical interface device at each node;
    selecting a wavelength of reception at each receiving node, the wavelength of reception corresponding to optical digital signals from a desired transmitting node, wherein the wavelength of reception for a node is different than the wavelength of transmission for that node;
    converting the optical digital signals received at the receiving nodes into the electrical digital signals; and
    providing a digital interconnect fabric for the network of nodes,
    wherein selecting the wavelength of reception comprises sending a control signal from the transmitting node to the receiving node to select the wavelength of reception.

4. An optical communication network, comprising:
    a bi-directional optical bus for routing optical digital signals at a plurality of different wavelengths;
    a plurality of nodes having terminal equipment for performing at least one of transmitting digital optical signals onto the bi-directional optical bus and receiving optical digital signals from the bi-directional optical bus;
    a plurality of passive optical interface devices connected to the bi-directional optical bus;
    the nodes connected to the bi-directional optical bus through the passive optical interface devices;
    the passive optical interface devices routing optical digital signals from the terminal equipment at the nodes onto the bi-directional optical bus in both directions;
    the passive optical interface devices routing optical digital signals traveling along the bi-directional optical bus in either direction toward the nodes;

each node being assigned a unique wavelength of transmission for transmitting optical digital signals;

each node receiving optical digital signals at least at one wavelength of reception, the wavelength of reception for a node being different than the wavelength of transmission for that node;

the bi-directional optical bus and the passive optical interface devices serving as a digital interconnect fabric for the plurality of nodes;

wherein each of the nodes receives optical control signals at a first wavelength and each node has a tunable receiver for selecting a second wavelength for receiving optical digital signals at the wavelength of reception.

5. The system as set forth in claim 4, wherein a transmitting node transmitting optical digital signals to a desired node provides optical control signals to the desired node informing the desired node of the wavelength of transmission for the transmitting node.

6. A method of exchanging digital signals between a plurality of nodes within a network, comprising:

generating electrical digital signals at each node transmitting digital signals;

assigning to each node transmitting digital signals a wavelength of transmission for its digital signals;

converting the digital signals into optical digital signals at the wavelength of transmission assigned to each transmitting node;

passively routing the optical digital signals onto a bi-directional optical bus;

routing the optical digital signals from each transmitting node in both directions along the bi-directional optical bus;

passively routing the optical digital signals to each node receiving optical digital signals;

selecting a wavelength of reception at each receiving node, the wavelength of reception corresponding to optical digital signals from a desired transmitting node, wherein the wavelength of reception for a node is different than the wavelength of transmission for that node and wherein selecting the wavelength of reception comprises sending a control signal from the transmitting node to the receiving node to select the wavelength of reception;

converting the optical digital signals received at the receiving nodes into the electrical digital signals; and providing a digital interconnect fabric for the network of nodes.

* * * * *